(12) United States Patent
Lee et al.

(10) Patent No.: US 9,292,435 B2
(45) Date of Patent: Mar. 22, 2016

(54) MEMORY DEVICE AND METHOD OF OPERATION

(75) Inventors: Jae Don Lee, Paju-si (KR); Gyu Sang Choi, Seoul (KR); Min Young Son, Seoul (KR); Choong Hun Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1595 days.

(21) Appl. No.: 12/535,785

(22) Filed: Aug. 5, 2009

(65) Prior Publication Data

US 2010/0131736 A1     May 27, 2010

(30) Foreign Application Priority Data

Nov. 21, 2008 (KR) .................. 10-2008-0116347

(51) Int. Cl.
*G06F 12/00* (2006.01)
*G06F 12/02* (2006.01)

(52) U.S. Cl.
CPC .... *G06F 12/0292* (2013.01); *G06F 2212/2022* (2013.01)

(58) Field of Classification Search
USPC .......................................................... 711/202
See application file for complete search history.

(56) References Cited

U.S. PATENT DOCUMENTS

| 5,404,485 A | 4/1995 | Ban | |
| 7,529,879 B2* | 5/2009 | Kim et al. | 711/103 |
| 7,783,851 B2* | 8/2010 | Im et al. | 711/165 |
| 2006/0212674 A1* | 9/2006 | Chung et al. | 711/202 |
| 2008/0098192 A1* | 4/2008 | Im et al. | 711/170 |
| 2008/0120488 A1* | 5/2008 | Woo et al. | 711/209 |
| 2010/0070735 A1* | 3/2010 | Chen et al. | 711/206 |

FOREIGN PATENT DOCUMENTS

| KR | 10-2004-0034580 | 4/2004 |
| KR | 10-0457812 | 11/2004 |
| KR | 10-0526188 | 11/2005 |
| KR | 10-0638638 | 10/2006 |
| KR | 10-007-0081750 | 8/2007 |
| KR | 10-0843135 | 7/2008 |

* cited by examiner

*Primary Examiner* — Jared Rutz
*Assistant Examiner* — Hamdy S Ahmed
(74) *Attorney, Agent, or Firm* — NSIP Law

(57) ABSTRACT

A memory device includes a data block storing first data, and a log block storing second data that is an updated value of the first data. A spare area of the log block stores a first mapping table including mapping information between the first data and the second data.

19 Claims, 6 Drawing Sheets

_US 9,292,435 B2_

MEMORY DEVICE AND METHOD OF OPERATION

CROSS-REFERENCE TO RELATED APPLICATION

This application claims the benefit under 35 U.S.C. §119(a) of a Korean Patent Application No. 10-2008-0116347, filed on Nov. 21, 2008, in the Korean Intellectual Property Office, the entire disclosure of which is incorporated herein by reference for all purposes.

BACKGROUND

1. Field

The following description relates to a memory device and a method of operating the memory device.

2. Description of Related Art

A non-volatile memory device is a semiconductor device that is able to electronically read, write, and erase, and to maintain stored data even when power is cut off. A process of storing data in the non-volatile memory device is referred to as programming or writing.

In addition, the non-volatile memory, particularly NAND flash memory, has a read time and a write time. The read time of the NAND flash memory takes several tens of microseconds per kilobyte and the write time takes several hundred microseconds per kilobyte. Also, the NAND flash memory may generally have an erase time different from the write time. Since the erase time is around several milliseconds, a method of erasing a plurality of memory cells at the same time is widely used to reduce the erase time with respect to entire data. In this instance, a unit of the plurality of memory cells that are simultaneously erased may be an erase unit or a block.

Programming with respect to the non-volatile memory device may be performed in page units and erasing may be performed in block units. A block may include a plurality of pages. The non-volatile memory device may provide a logical address to an external host or processor, and also provide a physical address with respect to a non-volatile memory device. The non-volatile memory device may manage the non-volatile memory device using the physical address and may convert the physical address into the logical address. A layer where converting of the physical address and logical address is performed is referred to as a Flash Translation Layer.

SUMMARY

In one general aspect, a memory device includes a data block configured to store first data; and a log block configured to store second data that is an updated value of the first data. The log block includes a spare area that is configured to store a first mapping table including mapping information between the first data and the second data.

Implementations may include one or more of the following features. For example, the data block may include a plurality of pages, and the first mapping table may include a plurality of fields, the plurality of fields respectively corresponding to the plurality of pages of the data block. The first data may be updated, and the second data may be stored in a clean page of the log block. When the first data is updated, the first mapping table may be stored in a spare area of the clean page where the second data is stored. When the first data is updated, a value may be stored in a field corresponding to the first page among the plurality of fields of the first mapping table, the value corresponding to the clean page where the second data is stored. When the first data is updated, the memory device may read a second mapping table stored in a spare area of a page adjacent to the clean page, copy a value stored in each field that is not corresponding to the first page from among the plurality of fields of the second mapping table, and respectively store the copied value in a field that is not corresponding to the first page from among the plurality of fields of the first mapping table.

When the clean page of the log block does not exist, a new log block may be assigned and the second data may be stored in a clean page of the new log block. The first mapping table may be stored in a spare area of the clean page of the new log block where the second data is stored.

When data corresponding to a first page from among the plurality of pages of the data block is read, the memory device may read data corresponding to the first page based on a value stored in a field corresponding to the first page from among the plurality of fields of the first mapping table stored in a spare area of a page adjacent to a clean page of the log block. When the value stored in the field corresponding to the first page is an address of a second page of the log block, the second data stored in the second page may be read out as data corresponding to the first page. When the value stored in the field corresponding to the first page does not exist, the memory device may read data corresponding to the first page based on a value stored in a field corresponding to the first page from among a plurality of fields of a third mapping table stored in the spare area of the first block that the log block refers to.

In another general aspect, a memory device includes a plurality of data blocks configured to store first data; at least one log block configured to store second data that is an updated value of the first data; and a metablock configured to store a mapping table that includes a mapping of a logical block address and a physical block address. The mapping table is configured to store a clean page offset corresponding to the physical block address.

Implementations may include one or more of the following features. For example, a first data block from among the plurality of data blocks may include a plurality of pages, and the first mapping table stored in a spare area of a first log block referring to the first data block may include a plurality of fields, the plurality of fields respectively corresponding to the plurality of pages of the data block. When data corresponding to a first page is read, the memory device may calculate a first logical block address and a first page offset corresponding to a logical page address of the first page, determine a first physical block address and a clean page offset of the first physical block corresponding to the first logical block address using the mapping table, and read data corresponding to the first page based on a value stored in a field corresponding to the first page from among a plurality of fields of the first mapping table stored in a spare area of a page adjacent to a clean page of the log block.

In another general aspect, memory is managed by storing first data in a data block; storing second data that is an updated value of the first data in a clean page of a log block; and storing a first mapping table including mapping information between the first data and the second data in a spare area of the clean page of the log block.

Implementations may include one or more of the following features. For example, the data block may include a plurality of pages and the first mapping table may include a plurality of fields, the plurality of fields respectively corresponding to the plurality of pages of the data block.

A field corresponding to a first page from among the plurality of fields of the first mapping table may store a value corresponding to the clean page where the second data is stored.

A new log block may be assigned when the clean page of the log block does not exist; the second data may be stored in a clean page of the new log block; and the first mapping table may be stored between the first data and the second data in a spare area of the clean page of the new log block.

When data corresponding to the first page from among the plurality of pages of the data blocks is read, a first logical block address and a first page offset corresponding to a logical page address of the first page may be calculated, and a first physical block address and a clean page offset of the first physical block corresponding to the first logical block may be determined using the mapping table; and data corresponding to the first page may be read based on a value stored in a field corresponding to the first page from among the plurality of fields of the first mapping table stored in a spare area of a page adjacent to a clean page of the log block.

In another general aspect, a computer readable recording medium stores a program implementing a method for managing a memory. The method includes storing first data in a data block; storing second data that is an updated value of the first data in a clean page of a log block; and storing a first mapping table including mapping information between the first data and the second data in a spare area of the clean page of the log block.

Other features and aspects will become apparent to those skilled in the art from the following detailed description, the drawings, and the claims.

Figure 1:
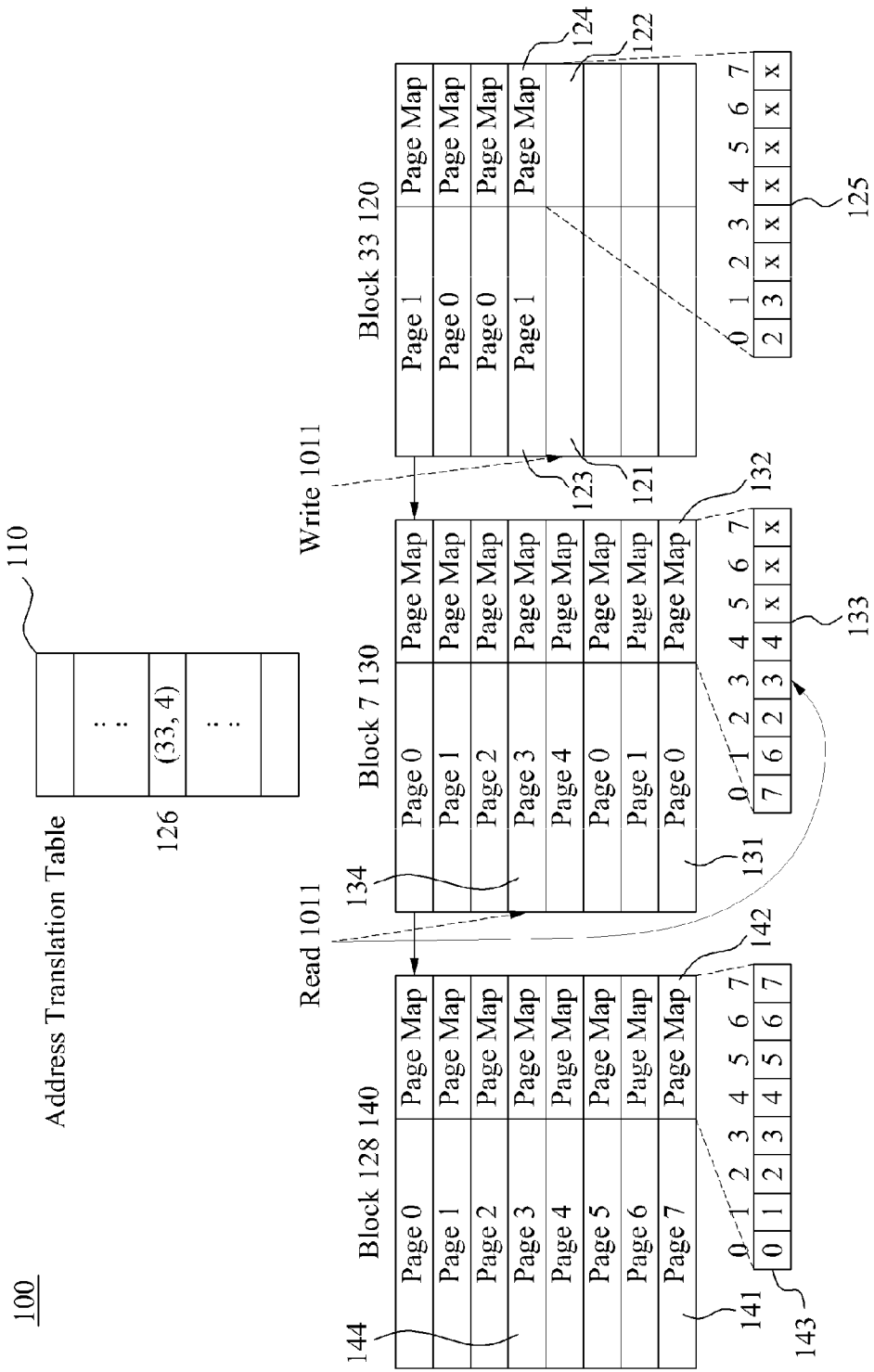
FIG. 1 is a block diagram of an exemplary memory device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods and systems described herein. Accordingly, various changes, modifications, and equivalents of the systems and methods described herein will be suggested to those of ordinary skill in the art. Also, description of well-known functions and constructions are omitted to increase clarity and conciseness.

FIG. 1 illustrates an exemplary memory device 100. The memory device 100 may be either a NAND flash memory, which, for example, is widely used for large-capacity storage, or a NOR flash memory. However, the memory device 100 is not limited to a specific memory configuration. Therefore, the flash memory may be a solid state disk (SSD) including the flash memory. The SSD is a device that embodies a large-capacity storage using a plurality of flash memory chips.

A read time of the NAND flash memory takes several tens of microseconds per kilobyte and a write time takes several hundred microseconds per kilobyte. Also, the NAND flash memory may generally have an erase time different from the write time. Since the erase time is around several milliseconds, a method of erasing a plurality of memory cells at the same time is widely used to reduce the erase time with respect to entire data. In this instance, a unit of the plurality of memory cells that are simultaneously erased may be an erase unit, an erase block, or a block.

A unit of a plurality of memory cells that simultaneously write or read data in the NAND flash memory is referred to as a page, that is, a block that includes a plurality of pages (e.g., 64 pages).

Also, each of the pages includes a plurality of sectors storing data and a spare area (storing data). The spare area is a storing area that each page of a memory (e.g. NAND flash memory) additionally includes. Metadata or information for error correction may be stored in the spare area. As an example, where a size of a page is 2 Kilobytes, a size of the spare area may be 64 bytes. Also, the spare area may be divided into more than two areas. However, the spare area is not limited to a specific size, configuration, or utilization, and if the spare area is another area besides the sector storing data in each page, it is not limited to the size and the utilization.

In some implementations, the memory device 100 includes a block mapping table 110, which is also referred to as an address translation table. The block mapping table 110 stores a physical block address and a clean page offset (CPO) of the physical block address in each of a plurality of fields (or entries) corresponding to a logical block address. As an example, if a physical block address, "126", corresponds to a logical block address, "33", a clean offset of the physical block address is "4".

A data block 140 may include a plurality of pages, for example, eight pages. A physical block address of the data block 140 is "128". Where first data is written in a Page 0 through a Page 7, a page mapping table may be stored in a spare area in each of the pages.

In exemplary implementations, a log block 130 includes eight pages, and a physical block address of the log block 130 is "7". The block (7) 130 refers to a data block (128) 140. Second data that is an updated value of the first data stored in each page of the block (128) 140, is stored in the block (7) 130.

Also, page mapping information between pages of the block (7) 130 and pages of the block (128) 140 is stored in a spare of each page of the block (7) 130. The mapping information may be a mapping table. For example, a mapping table 133 stored in a spare area 132 of a Page 7 (labeled as Page 0, as described below) of the block (7) 130 has eight fields. The eight fields respectively correspond to eight pages of the data block (128) 140.

A field 0 of the page mapping table 133 stores "7". Accordingly, second data that is an updated data of first data of a Page 0 of the block (128) 140 is stored in the Page 7 of the block (7) 130 (Page 7 of the block (7) 130 is labeled as Page 0 to illustrate Page 0 of the block (128) 140). A field 1 of the page mapping table 133 stores "6". Accordingly, second data that is an updated data of first data of a Page 1 of the block (128) 140 is stored in a Page 6 of the block (7) 130 (Page 6 of the block (7) 130 is labeled as Page 1 to illustrate Page 1 of the block (128) 140). In the same manner, as indicated in a field 2 of the page mapping table 133, second data that is an updated data of first data of a Page 2 of the block (128) 140 is stored in a Page 2 of the block (7) 130. Also, as indicated in a field 3 of the page mapping table 133, second data that is an updated data of first data of a Page 3 of the block (128) 140 is stored in a Page 3 of the block (7) 130. Also, as indicated in a field 4 of the page mapping table 133, second data that is an updated data of first data of a Page 4 of the block (128) 140 is stored in a Page 4 of the block (7) 130.

However, field 5 through field 7 of the page mapping table 133 does not store a value (and is therefore labeled with an "x"), which signifies either free or invalid. Accordingly, an updated value of first data of a Page 5 through a Page 7 of the block (128) 140 is not stored in the block (7) 130.

Where data is not stored in a page (or a field of a table), the page is free. Also, where data is stored in the page and the stored data is valid, the page is valid. However, where data is stored in the page but the stored data is not valid, the page is invalid.

A log block 120 also includes eight pages. A physical block address of the log block 120 is "33". The log block (33) 120 refers to the log block (7) 130. Second data is stored in each of pages of the log block (33) 120, the second data being an updated value of the first data stored in each of pages of the block (128) 140.

Also, page mapping information between pages of the block (33) 120 and pages of the block (128) 140 is stored in a spare page of the block (33) 120. The mapping information may be a page mapping table. For example, a mapping table 125 stored in a spare area 124 of a Page 3 of the block (33) 120 has have eight fields (labeled as Page 1, as described below). The eight fields respectively correspond to the eight pages of the data block (128) 140.

A field 0 of the page mapping table 125 includes "2". Accordingly, second data that is an updated data of first data of a Page 0 of the block (128) 140 is stored in a Page 2 of the block (33) 120 (Page 2 of the block (33) 120 is labeled as Page 0 to illustrate Page 0 of the block (7) 130). A field 1 of the page mapping table 125 includes "3". Accordingly, second data that is an updated data of first data of a Page 1 of the block (128) 140 is stored in a Page 3 123 of the block (33) 120 (Page 3 of the block (33) 120 is labeled as Page 1 to illustrate Page 1 of the block (7) 130).

However, field 2 through field 7 of the page mapping table 125 does not store a value (and is labeled with an "x"), which signifies either free or invalid. Accordingly, an updated value of first data of a Page 2 through a Page 7 of the block (128) 140 is not stored in the block (33) 120.

A process of storing data in or reading the data from the memory device 100 is described later with reference to FIGS. 5 and 6.

Figure 2:
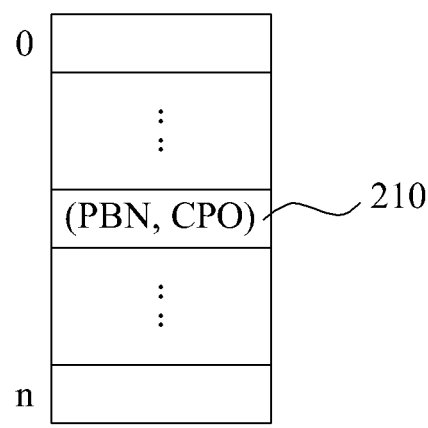
FIG. 2 is a diagram of an exemplary block mapping table.

FIG. 2 illustrates an exemplary block mapping table 200 that is included in a NAND flash memory. However, exemplary implementations may not be limited thereto, and other exemplary implementations, the block mapping table 200 is stored in DRAM where a memory device 100 is booted up. In this instance, it is simple to randomly update a physical block address (PBA) (hereinafter, also referred to as a physical block address, PBA) or a clean page offset (CPO).

However, the block mapping table 200 stores a physical block number (PBN) and a CPO of the physical block address in each of a plurality of fields, for example, a field 210, corresponding to n virtual block addresses (VBA) (or logical block addresses), n being a natural number.

In some implementations, the memory device 100 accesses (reads, writes, and the like) a page having a logical page address, "1011", the memory device 100 calculates a logical block address and a clean page offset. Also, the memory device 100 determines the physical block address and the clean page offset corresponding to the page having the logical page address, "1011", based on a value stored in a field corresponding to the calculated logical block address.

Figure 3:
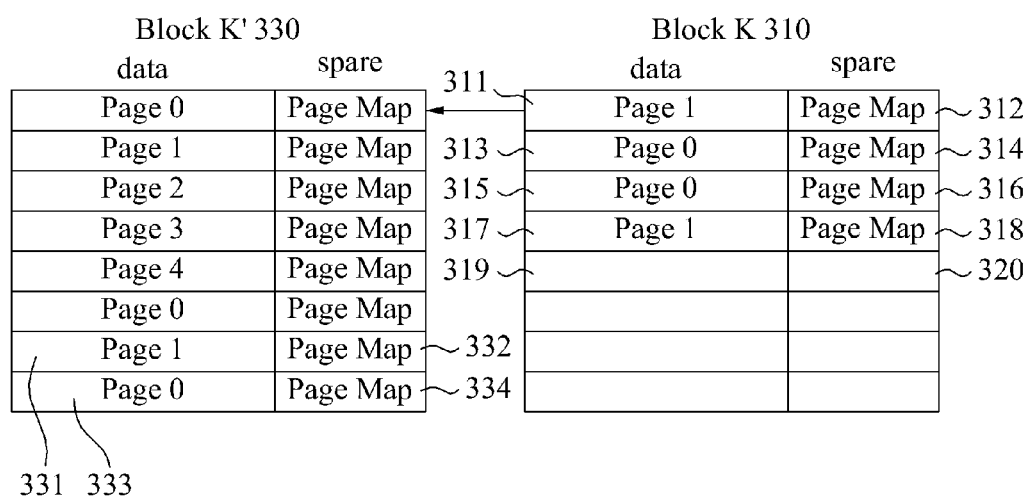
FIG. 3 is a diagram of an exemplary log block that refers to another log block in a memory device.

FIG. 3 illustrates an exemplary log block K 310 that refers to another log block K' 330 in a memory device. Each page of the log block K' 330 may refer to another log block or a data block.

In some implementations, second data that is an updated value of a Page 1 of a data block (not illustrated) related to the log block K' 330 in a sector 331 of a Page 6 of the log block K' 330. In this instance, a field 1 (not illustrated) of a page mapping table stores "6", the page mapping table being included in a spare area 332 of the Page 6 of the block K' 330. Second data that is an updated value of a Page 0 of the data block related to the log block K' 330 is stored in a sector 333 of a Page 7 of the log block K' 330. In this instance, a field 0 (not illustrated) of a page mapping table stores "7", the page mapping table being stored in a spare area 334 of the Page 7 of the block K' 330.

Also, a block K 310 is newly assigned to store second data that is once again an updated value of the Page 1 of the data block related to the log block K' 330.

The second data that is once again an updated value of the Page 1 of the data block related to the log block K' 330 is stored in a sector 311 of a Page 0 of the log block K 310. In this instance, a field 1 (not illustrated) of a page mapping table stores "0", the page mapping table being stored in a spare area 312 of the Page 0 of the block K 310.

Also, second data that is once again an updated value of the Page 0 of the data block related to the log block K' 330 is stored in a sector 313 of a Page 1 of the log block K 310. In this instance, a field 0 (not illustrated) of a page mapping table stores "1", the page mapping table being stored in a spare area 314 of the Page 1 of the block K 310.

Also, second data that is once again an updated value of the Page 0 of the data block related to the log block K' 330 is stored in a sector 315 of a Page 2 of the log block K 310. In this instance, a field 0 (not illustrated) of a page mapping table stores "2", the page mapping table being stored in a spare area 316 of the Page 2 of the block K 310.

Also, second data that is once again an updated value of the Page 1 of the data block related to the log block K' 330 is stored in a sector 317 of a Page 3 of the log block K 310. In this instance, a field 1 (not illustrated) of a page mapping table stores "3", the page mapping table being stored in a spare area 318 of the Page 3 of the block K 310.

In exemplary implementations, when the memory device 100 updates first data stored in one page of a plurality of pages of a data block (not illustrated) related to the log block K' 330, the memory device 100 detects whether the block K 310 is full. Also, second data that is an updated value of the first data is stored in a sector 319 of a Page 4 of the log block K 310. Also, the memory device 100 stores "4" in a field corresponding to a page in which the first data is updated from among a plurality of fields stored in a spare area 320 of the Page 4 of the block K 310.

A process of updating the first data is described in detail with reference to FIG. 5.

In exemplary implementations, when the memory device 100 reads Page 1 of the data block related to the log block K' 330, the memory device 100 reads the field 1 of the page mapping table, the page mapping table being stored in the spare area 318 of the Page 3 of the block K 310. Also, the memory device 100 returns data stored in the sector 317 of the Page 3 of the log block K 310 based on a value stored in the field 1.

Also, when the memory device 100 reads a Page 0 of a data block (not illustrated) related to the log block K' 330, and the memory device 100 reads a field 0 of a page mapping table, the page mapping table being stored in the spare area 318 of the Page 3 of the block K 310. Also, the memory device 100 returns data stored in the sector 315 of the Page 2 of the log block K 310 based on a value stored in the field 0.

However, when the memory device 100 reads a Page 3 of a data block (not illustrated) related to the log block K' 330, and the memory device 100 reads a field 3 of a page mapping table, the page mapping table stored in the spare area 318 of the Page 3 of the block K 310. However, if the field 3 is either clean or invalid, the memory device 100 accesses the block K' 330 that the block K 310 refers to. Also, the memory device 100 returns data stored in a sector of a Page 3 of the block K' 330 based on data stored in a field 3 of a page mapping table, the page mapping table being stored in the spare area 334 of the last page, that is, Page 7, of the block K' 330.

The memory device 100 reads data according to a procedure that is described with reference to FIG. 6.

Figure 4:
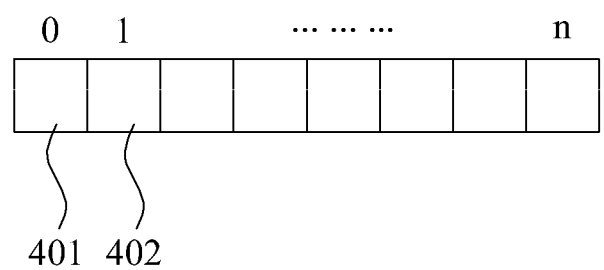
FIG. 4 is a diagram of an exemplary page map stored in a spare area of each page.

FIG. 4 illustrates an exemplary page map 400 stored in a spare area of each page. The page map 400 can be referred to as a page mapping table 400. The page mapping table 400 may include a plurality of fields. The plurality of fields (field 0 through field n, and in this instance, n is a value obtained by subtracting one from a number of pages included in a single data block) respectively correspond to pages (Page 0 through Page n) of a data block. For example, a field 401 corresponds to a Page 0 of a data block (128) 140 of FIG. 1, and a field 402 corresponds to Page 1 of a block (128) 140.

Each of the fields of the page mapping table 400 may store page information for a page in which second data is stored, the second data being updated from first data of a corresponding page. However, in some implementations, the mapping table 400 is stored in a spare area of each page of the data block (128) 140.

Figure 5:
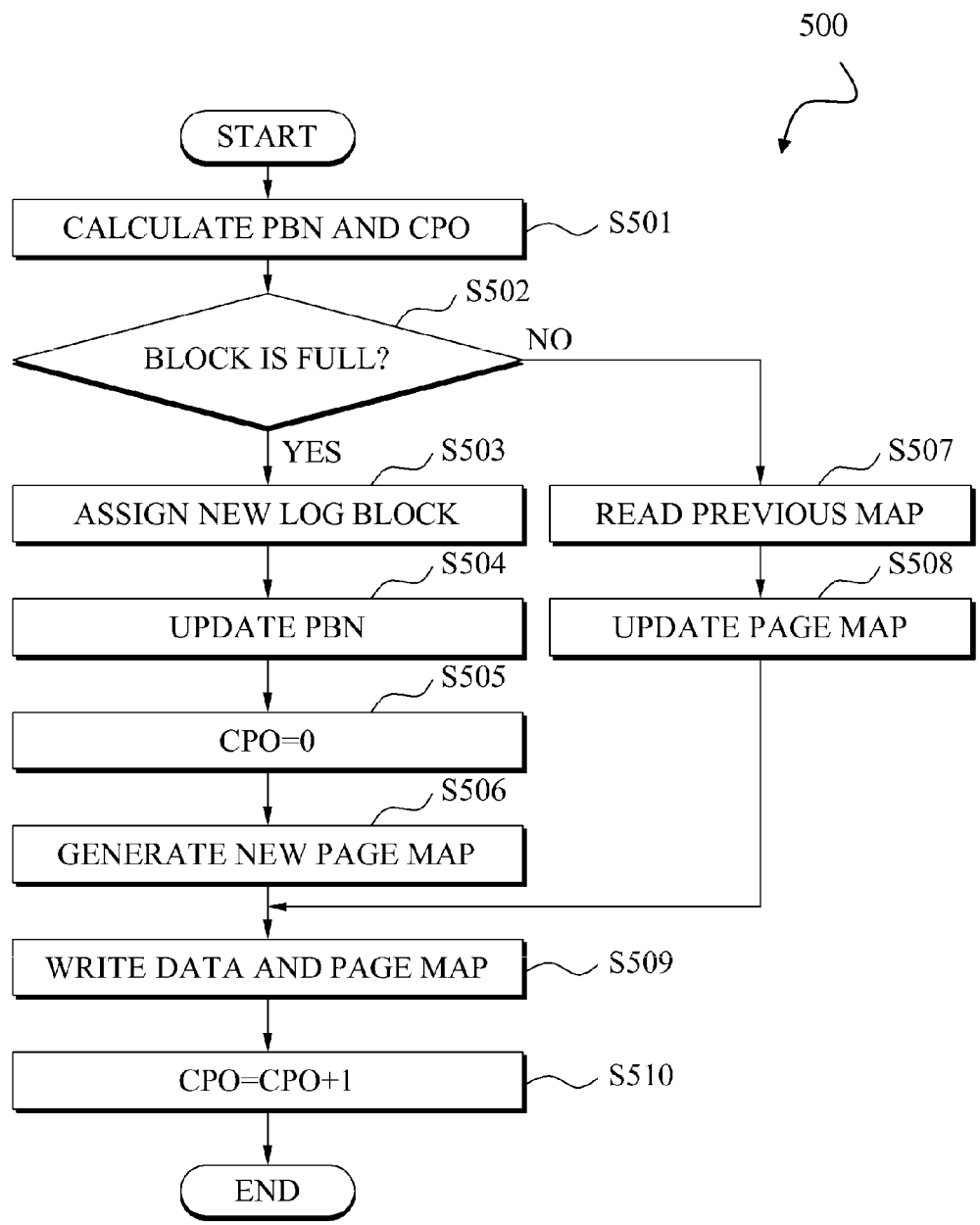
FIG. 5 is a flow chart of an exemplary procedure for updating first data stored in a data block of a memory device.

FIG. 5 illustrates an exemplary procedure 500 for updating first data stored in a data block of a memory device. In operation S501, a logical page address in which first data is updated and second data that is an updated value of the first data is inputted. In this instance, the logical page address is divided into a number of pages of the block.

As an example, referring also to FIG. 1, where the logical page address is "1011" and a single block includes eight pages, the logical block address is 1011/8=126, and a page offset is "3". Also, a physical block address corresponding to the logical block address, "126" is determined to be "33", and a clean page offset of the physical block address, "33", is determined to be "4".

In operation S502, the memory device 100 determines whether the block (33) 120 is full, where the block is full if there is a no clean page in the block 33.

In some implementations, it can be determined whether the clean page exists in the physical block address "33" based on the clean page offset. Since a number of pages included in a single block is eight, if the clean page offset is determined to be 8, then it is determined that there is no clean page in the block 33. In this instance, since the block of the physical block address "33" is full, the memory device 100 may assign a new log block (not illustrated) to store the second data in operation S503.

Also, in operation S504, a physical block address corresponding to the logical block address 126 in the block mapping table 110 is updated as a physical address of the newly assigned log block. Accordingly, where the page address "1011" is accessed, subsequently, a physical block address (PBA) may be a physical address of the newly assigned log block, instead of "33". Also, information that the newly assigned log block refers to the block (33) 120 is stored.

In operation S505, a CPO corresponding to the logical block address 126 in the block mapping table 110 is stored as "0".

In operation S506, a new page map to be stored in a spare area of Page 0 of the newly assigned log block is generated. The new page map may be a mapping table, and a detailed exemplary configuration is shown in FIG. 4.

In some exemplary implementations, since a single block includes eight pages, the generated page mapping table includes a field 0 through a field 7. The field 0 of the page mapping table corresponds to a Page 0 of a data block (a block (128) 140 of FIG. 1). Also, a field 3 of the page mapping table corresponds to a Page 3 of the data block.

In some exemplary implementations, a logical page address "1011" is updated, and in this instance, a page offset is "3". That is, the Page 3 of the data block (128) 140 is updated as second data. Accordingly, the field 3 of the generated page mapping table stores "0", which is a clean page offset, and remaining fields of the page mapping table remains clean or the remaining fields of the page mapping table may be invalid.

In operation S509, the second data is stored in a sector of Page 0 of the newly assigned log block (not illustrated) and the generated page mapping table is stored in the spare area of the Page 0 of the newly assigned log block.

Also, the memory device 100 increases a clean page offset (CPO) corresponding the logical block address, "126" of the block mapping table 110 by 1 based on CPO=CPO+1.

In operation S502, if it is determined that the block (33) 120 is not full, that is, a clean page offset is not 8, operation S507 may be performed. For example, the CPO may be 4, as illustrated in FIG. 1. In this instance, the memory device 100 reads out a page map of a Page 3, which is a previous page of a Page 4 of the block (33) 120, the Page 4 being a clean page.

In operation S508, the memory device 100 updates the read page map. According to exemplary implementations, the Page 3 of the data block is updated as second data. Accordingly, the CPO "4" is stored in a field 3 of the page mapping table and remaining fields of the page mapping table copies the page map read out from a spare area of the Page 3.

Accordingly, a page map to be stored in a spare area 122 of a Page 4 of the data block (33) 120 stores "4" in the field 3 of the page map 125 stored in the spare area 124 of a Page 3, and remaining fields are identical to the page map 125.

Subsequently, the page map 125 stored in the spare area 124 of the page 3 is no longer valid. Instead, a page map (not illustrated) stored in the spare area 124 of a Page 4 is valid.

Also, in operation S509, second data that updates the Page 3 of the block (33) 120 is stored in a sector 121 of a Page 4 of the block (33) 120 and the valid page map is stored in a spare area 122 of the Page 4 of the block 33.

In this instance, the memory device 100 increases CPO corresponding the logical block address of the block mapping table 110 by 1 based on CPO=CPO+1 in operation S510, and a CPO becomes "5". Accordingly, the CPO corresponding to the logical block address, "126", of the block mapping table is "5".

Figure 6:
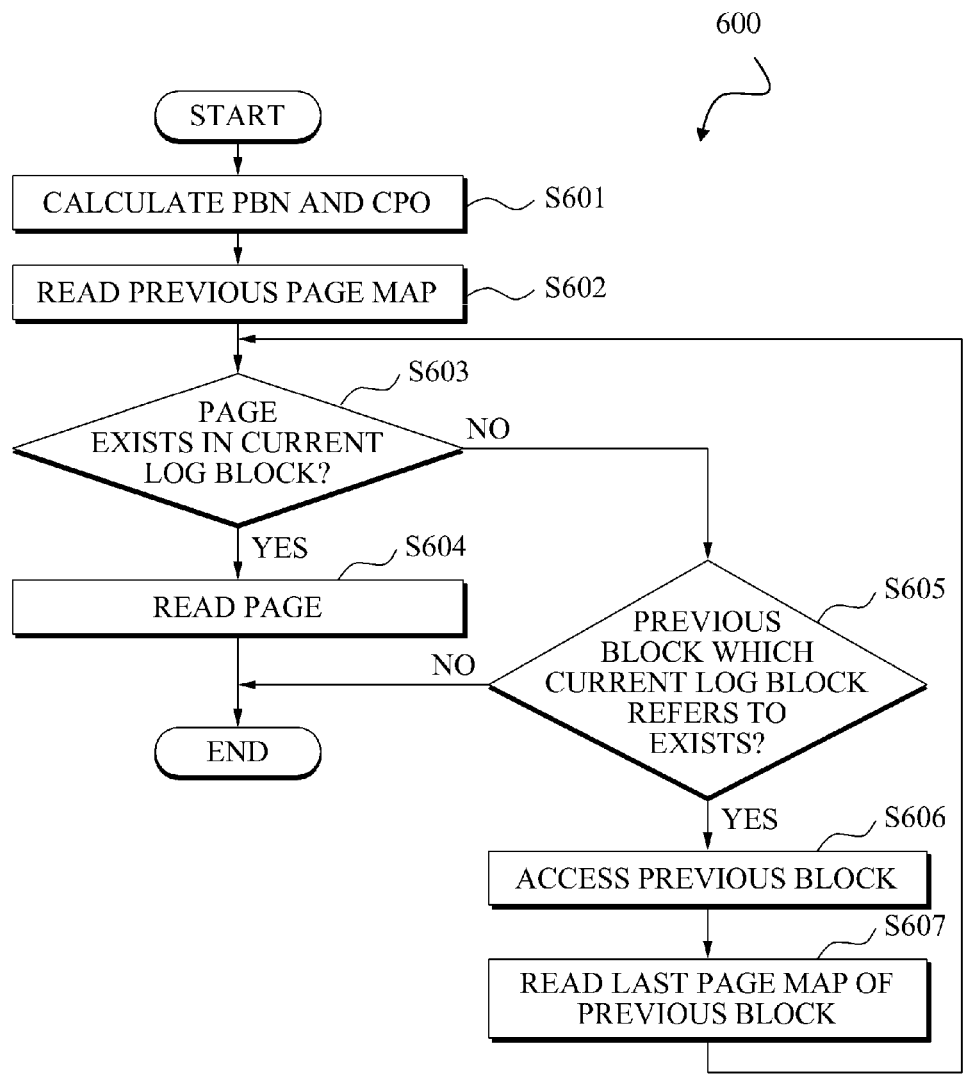
FIG. 6 is a flow chart of an exemplary procedure for reading data from a memory device.

FIG. 6 illustrates an exemplary procedure 600 reading data from a memory device 100.

In operation S601, a logical page address where data is read is inputted. In this instance, the logical page address is divided by a number of pages of a block. As an example, where the logical page address is "1011" and a single block includes eight pages, a logical block address is 1011/8=126, and a page offset is "3". That is, a latest updated value of a Page 3 of a block having the logical block address "126" is read.

Also, a physical block address corresponding to the logical block address "126" is determined to be "33" and a clean page offset of the physical block address "33" is determined to be "4", using a block mapping table 110.

In operation S602, the memory device 100 reads a page map 125 stored in a spare area 124 of a previous page of a Page 4, which is a clean page, of a block (33) 120.

Also, the memory device 100 determines whether second data that is an updated value of a page (a Page 3 of the block (128) 140) to be read exists in a current log block, the block (33) 120 in operation S603. If a page number is not stored in a field 3 of the page map 125 (e.g., if the field 3 is either clean or invalid), the second data that is an updated value of the Page 3 of the block (128) 140 does not exist in the block (33) 120.

In this instance, the memory device 100 determines whether a previous block that refers to the block (33) 120 exists in operation S605. If the previous block that refers the block (33) 120 does not exist, an error massage is returned and a process of reading is completed.

Referring again to FIG. 1, since a block (7) 130 that refers to the block (33) 120 exists, operation S606 is performed. In operation S606, the memory device 100 accesses the block 130, and reads a page map 133 stored in a spare area 132 of a last page, Page 7. Also, operation S603 is performed again, and the memory device 100 determines whether the second data exists in the block (7) 130, which is the current log block, the second data being an updated value of the page (the Page 3 of the block (128) 140) to be read.

In the situation in which a page number, "3" is stored in a field 3 of the page map 133, the memory device 100 determines that the second data that is an updated value of the page to be read exists in the Page 3 of the block (7) 130, which is the current log block.

Subsequently, the memory device 100 reads the second data from a sector 134 of the Page 3 of the block (7) 130 and returns the same as a data value with respect to the logical address, "1011".

According to example(s) described above, a memory device and a memory management method may be provided that may reduce a storage space of a mapping table for mapping a logical address and a physical address.

Also, a memory device and a memory management method may be provided that may effectively process a read command or a write command with respect to a non-volatile memory.

The method of operating a memory device may be recorded in computer-readable storage media including program instructions to implement various operations embodied by a computer or computer system. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Flash memory devices and/or memory controllers may be embodied using various types of packages. For example, the flash memory devices and/or memory controllers may be embodied using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Quad Flatpack (QFP), Small Outline Integrated Circuit (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The flash memory devices and/or the memory controllers may constitute memory cards. In this case, the memory controllers may be constructed to communicate with an external device for example, a host using any one of various types of interface protocols such as a Universal Serial Bus (USB), a Multi Media Card (MMC), a Peripheral Component Interconnect-Express (PCI-E), Serial Advanced Technology Attachment (SATA), Parallel ATA (PATA), Small Computer System Interface (SCSI), Enhanced Small Device Interface (ESDI), and Integrated Drive Electronics (IDE).

The flash memory devices may be non-volatile memory devices that can maintain stored data even when power is cut off. According to an increase in the use of mobile devices such as a cellular phone, a personal digital assistant (PDA), a digital camera, a portable game console, and an MP3 player, the flash memory devices may be more widely used as data storage and code storage. The flash memory devices may be used in home applications such as a high definition television (HDTV), a digital video disk (DVD), a router, and a Global Positioning System (GPS).

The computing system may include a microprocessor that is electrically connected with a bus, a user interface, a modem such as a baseband chipset, a memory controller, and a flash memory device. The flash memory device may store N-bit data via the memory controller. The N-bit data is processed or will be processed by the microprocessor and N may be 1 or an integer greater than 1. If the computing system is a mobile apparatus, then a battery may be additionally provided to supply operation voltage of the computing system.

The computing system may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A memory device comprising:
   a data block storing first data and comprising pages; and
   a log block comprising
      a clean page configured to store second data that is an updated value of the first data, and a spare area configured to store a first mapping table including mapping information between the first data and the second data and to store a third mapping table; wherein the data block includes pages, and the first mapping table includes fields respectively corresponding to the pages of the data block, wherein the memory device is configured to read data corresponding to a first page based on a value stored in a field corresponding to the first page from among fields of the third mapping table stored in a spare area of a first block that the log block refers to, in response to the value stored in the field corresponding to the first page not existing.

2. The memory device of claim 1, wherein, when the first data is updated, the second data is stored in the clean page of the log block in response to the first data being updated.

3. The memory device of claim 2, wherein a new log block is assigned and the second data is stored in a clean page of the new log block, in response to the clean page of the log block not existing.

4. The memory device of claim 3, wherein the first mapping table is stored in a spare area of the clean page of the new log block where the second data is stored.

5. The memory device of claim 2, wherein, when the first data is updated, the first mapping table is stored in the spare area of the clean page where the second data is stored in response to the first data being updated.

6. The memory device of claim 5, wherein, when the first data is updated, a value is stored in a field corresponding to the first page among the fields of the first mapping table in response to the first data being updated, the value corresponding to the clean page where the second data is stored.

7. The memory device of claim 6, configured to:
read the second mapping table stored in a spare area of a page adjacent to the clean page in response to the first data being updated.

8. The memory device of claim 6, configured to
copy a value stored in each field that is not corresponding to the first page from among the fields of the second mapping table in response to the first data being updated.

9. The memory device of claim 6, wherein, in response to the first data being updated, the memory device is configured to:
read the second mapping table stored in a spare area of a page adjacent to the clean page,
copy a value stored in each field that is not corresponding to the first page from among the fields of the second mapping table, and
respectively store the copied value in a field that is not corresponding to the first page from among the fields of the first mapping table, in response to the first data being updated.

10. The memory device of claim 1, wherein, the memory device is configured to read the data corresponding to the first page based on a value stored in a field corresponding to the first page from among the fields of the first mapping table stored in a spare area of a page adjacent to a clean page of the log block, in response to the data corresponding to the first page from among the pages of the data block being read.

11. The memory device of claim 10, wherein the second data stored in a second page is read out as data corresponding to the first page in response to the value stored in the field corresponding to the first page being an address of the second page of the log block.

12. A memory device, comprising:
data blocks configured to store first data;
a log block comprising a clean page configured to store second data that is an updated value of the first data, and comprising a spare area configured to store a first mapping table including mapping info between the first data and the second data and to store a third mapping table; and
a metablock configured to store a mapping table that includes a mapping of a logical block address and a physical block address, the mapping table configured to store a clean page offset corresponding to the physical block address, wherein
a first data block from among the data blocks includes pages,
the first mapping table includes fields respectively corresponding to the pages of the first data block, and
the memory device is configured to read data corresponding to a first page based on a value stored in a field corresponding to the first page from among fields of the third mapping table stored in a spare area of a first block that the log block refers to, in response to the value stored in the field corresponding to the first page not existing.

13. The memory device of claim 12,
wherein, in response to the data corresponding to the first page being read, the memory device is configured to calculate a first logical block address and a first page offset corresponding to a logical page address of the first page;
determine a first physical block address and the clean page offset of the first physical block corresponding to the first logical block address using the mapping table; and
read the data corresponding to the first page based on a value stored in the field corresponding to the first page from among fields of the first mapping table stored in a spare area of a page adjacent to the clean page of the log block.

14. The memory device of claim 12, the clean page offset indicating whether the physical block is full.

15. A method for managing a memory, the method comprising:
storing first data in a data block;
storing second data that is an updated value of the first data in a clean page of a log block; and
storing a first mapping table including mapping information between the first data and the second data in a spare area of the clean page of the log block;
storing a third mapping table in the spare area;
reading data by the memory device corresponding to a first page based on a value stored in a field corresponding to the first page from among fields of the third mapping table stored in a spare area of a first block that the log block refers to, in response to the value stored in the field corresponding to the first page not existing, wherein
the data block includes a plurality of pages, and the first mapping table includes a plurality of fields respectively corresponding to the plurality of pages of the data block.

16. The method of claim 15, wherein a field corresponding to a first page from among the plurality of fields of the first mapping table stores a value corresponding to the clean page where the second data is stored.

17. The method of claim 15, further comprising:
assigning a new log block when the clean page of the log block does not exist;
storing the second data in a clean page of the new log block; and storing the first mapping table between the first data and the second data in a spare area of the clean page of the new log block.

18. The method of claim 15, when data corresponding to the first page from among the plurality of pages of the data blocks is read, further comprising:

calculating a first logical block address and a first page offset corresponding to a logical page address of the first page, and determining a first physical block address and a clean page offset of the first physical block corresponding to the first logical block using the mapping table; and reading data corresponding to the first page based on a value stored in a field corresponding to the first page from among the plurality of fields of the first mapping table stored in a spare area of a page adjacent to a clean page of the log block.

19. A non-transitory computer readable storage medium storing a program to implement a method for managing a memory, comprising instructions configured to cause a computer to:

store first data in a data block;

store second data that is an updated value of the first data in a clean page of a log block;

store a first mapping table including mapping information between the first data and the second data in a spare area of the clean page of the log block and store a third mapping table, and read data corresponding to a first page based on a value stored in a field corresponding to the first page from among fields of the third mapping table stored in a spare area of a first block that the log block refers to, in response to the value stored in the field corresponding to the first page not existing, wherein the data block includes a plurality of pages, and the first mapping table includes a plurality of fields respectively corresponding to the plurality of pages of the data block.

* * * * *